(12) United States Patent
Shirota (10) Patent No.: US 7,160,118 B2
(45) Date of Patent: Jan. 9, 2007

(54) ELECTRIC JUNCTION BOX

(75) Inventor: Toshiya Shirota, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/183,910

(22) Filed: Jul. 19, 2005

(65) Prior Publication Data

US 2006/0040526 A1 Feb. 23, 2006

(30) Foreign Application Priority Data

Aug. 20, 2004 (JP) .............................. 2004-240365

(51) Int. Cl.
*H01R 12/00* (2006.01)
(52) U.S. Cl. ..................... 439/76.2; 439/949
(58) Field of Classification Search ............... 439/76.1, 439/76.2, 590, 736, 751, 949
See application file for complete search history.

(56) References Cited

U.S. PATENT DOCUMENTS

| | | | |
|---|---|---|---|
| 6,494,723 B1 | 12/2002 | Yamane et al. | |
| 6,602,079 B1 | 8/2003 | Chiriku et al. | |
| 6,693,370 B1 | 2/2004 | Yamane et al. | |
| 6,785,139 B1 | 8/2004 | Onizuka et al. | |
| 6,875,028 B1 | 4/2005 | Kita et al. | |
| 6,948,950 B1 | 9/2005 | Yamaguchi | |
| 2003/0168432 A1 | 9/2003 | Onizuka et al. | |

FOREIGN PATENT DOCUMENTS

| | | |
|---|---|---|
| JP | 11-285132 | 10/1999 |
| JP | 2001-319708 | 11/2001 |

OTHER PUBLICATIONS

U.S. Appl. No. 11/201,427, Shirota, filed on Aug. 11, 2005.
English language Abstract of JP 2001-319708.
English language Abstract of JP 11-285132.

*Primary Examiner*—Khiem Nguyen
(74) *Attorney, Agent, or Firm*—Greenblum & Bernstein, P.L.C.

(57) ABSTRACT

An electric junction box for installation in an automobile includes a power distributor as an internal circuit component of the electric junction box. The power distributor has relays mounted on one side of printed circuit board and connected to the printed conductor, and has bus bars fixed on the other side of printed circuit board. The power distributor is divided into a power distributor for a battery side connection and power distributor for an alternator side connection. The power distributor for the battery side connection and the power distributor for the alternator side connection are placed facing each other oppositely, and have respective heat sinks facing outwardly. A branch circuit block is provided in the lower region of power distributors, which is formed from a lamination of bus bars and insulation plates.

16 Claims, 5 Drawing Sheets

ELECTRIC JUNCTION BOX

BACKGROUND OF THE INVENTION

1. Field of the Invention

The present invention relates to an electric junction box. Specifically, the electric junction box is configured for installation in an automobile and includes a power distributor (PD). The PD includes relays, as well as other electronic components, mounted on one side of a circuit board and bus bars fixed on the other side of the circuit board.

2. Description of Related Art

Conventionally, an electric junction box, such as those junction boxes for distributing electric power to each of the wire harnesses in an automobile, has a large number of relays and fuses, and a connector-connecting portion is formed on the outer surface of the box for connecting bus bar circuits to wire harnesses, the bus bar circuits being contained inside the electric junction box. In recent years, the number of electrical circuits in an automobile has increased in accordance with the sharp increase in the number of electronic components installed in an automobile, as the automobile becomes more and more sophisticated. Therefore, the number of relays mounted in an electric junction box for installation in an automobile has become larger, thereby forcing the electric junction box to become more dense, as well as larger.

In response to such situation, an electric junction box has been provided with a power distributor (PD) built therein. The PD includes semiconductor switching devices (FET) and mounting relays such as SMD relays mounted on a printed circuit board, and a heat sink fixed on the other side of the printed circuit board.

Figure 5:
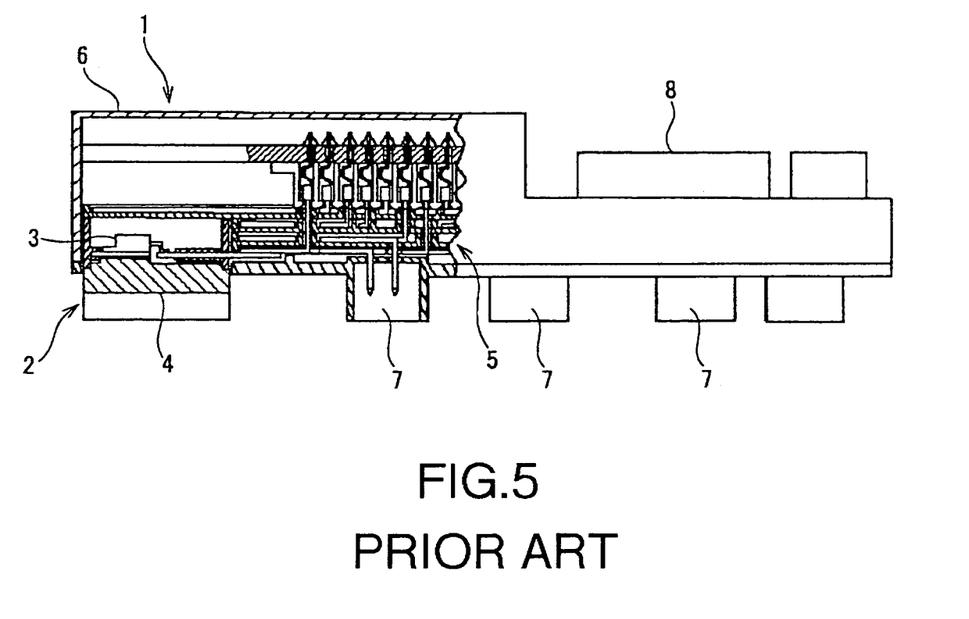
FIG. 5 shows an example of a conventional electric junction box.

For example, in Japanese Laid Open Patent Publication No. 2001-319708, shown in FIG. 5 of the present application, electric junction box 1 is disclosed, which includes power distributor PD 2 and branch circuit block 5. In PD 2, semiconductor switching device (FET) 3 is mounted on a printed circuit board; a bus bar is fixed on the back-side of the printed circuit board; FET 3, which requires large electrical current, is connected to the bus bar; and heat sink 4 is attached to the bus bar. Branch circuit block 5 is made from the lamination of bus bars and insulation plates. On the lower surface of case 6 of electric junction box 1, connector housings 7 are provided for permitting insertion of connectors of wire harnesses (not shown) installed in a vehicle. On the upper surface of case 6, fuse housing 8 is provided. Connector housings 7 and fuse housing portion 8 are connected to branch circuit block 5.

However, as it stands now, PD 2 of electric junction box 1 is made by using single circuit board. Since PD 2 is laterally juxtaposed to branch circuit block 5 in a horizontal direction, electric junction box 1 is enlarged by an amount measured by the dimensions of PD 2. This causes a problem in that the installation space required for installing electric junction box 1 in a vehicle becomes large. Further, when PD 2 is laminated on the lower surface of branch circuit block 5 for the purpose of minimizing the horizontal area of electric junction box 1, it puts restrictions on locations for connector housings 7. Power input and output between a wire harness and PD 2 is done via branch circuit block 5 from connector housings 7. Therefore, when making a design for the arrangement of connectors for each destination, there is a problem that circuit wirings of PD 2 and branch circuit block 5 become complicated.

Further, since heat sink 4 is exposed only on the lower surface of case 6 for radiating outwardly the heat generated in PD 2, it is possible that, depending on the position of electric junction box 1 relative to other components in a vehicle, the heat radiation capability of electric junction box 1 is not sufficient.

The present invention is provided to address the above-described problems. That is, the present invention reduces the size, simplifies, and enhances the heat radiation capability of an electric junction box having PDs built in it.

SUMMARY OF THE INVENTION

An objective of the present invention is to reduce the size and simplify an electric junction box having a power distributor (PD) mounted therein, as well as to provide a configuration for the electric junction box that enhances its heat-radiation capability.

Accordingly, one feature of the present invention is to provide an electric junction box for installation in an automobile. The electric junction box includes a power distributor that is an internal circuit component of the electric junction box. The power distributor has relays and other electronic components mounted on one side of a printed circuit board and connected to a printed conductor, has bus bars fixed on the other side of said printed circuit board, and has heat sinks attached to the bus bar side of the printed circuit board.

The power distributor includes a power distributor for a battery side connection and a power distributor for an alternator side connection. The power distributor for the battery side connection and the power distributor for the alternator side connection face each other and each have the heat sinks facing away outwardly from the electric junction box. A branch circuit block is arranged perpendicular to the power distributor for the battery side connection and the power distributor for the alternator side connection, and is constructed from a lamination of bus bars and insulation plates.

Ends of the bus bars of the power distributors may be welded to the ends of the bus bars of the branch circuit block. The power distributor for the battery side connection and the power distributor for the alternator side connection may be vertically disposed. The branch circuit block may be horizontally disposed in a lower region of the power distributor for the battery side connection and the power distributor for the alternator side connection. The branch circuit block may have a bus bar connected to a connector at an end of a wire harness, in which the connector at the end of the wire harness is inserted into a connector housing provided on a lower case of the electric junction box.

Further, the electric junction box may include power input bus bars having a bus bar for a battery connection and a bus bar for an alternator connection. The power input bus bars may be disposed in an upper region of the power distributor for the battery side connection and the power distributor for the alternator side connection, and is connected via fuses to the bus bars of the power distributor for the battery side connection and the power distributor for the alternator side connection.

The bus bar for the battery connection and the bus bar for the alternator connection may have branched insulation displacement connection tabs, and are connected to fuses by insulation displacement connections by inserting input terminals of the fuses into slots of the insulation displacement connection tabs of the bus bar for the battery connection and the bus bar for the alternator connection.

The bus bars of the power distributor for the battery side connection and the power distributor for the alternator side connection have insulation displacement connection tabs, and are connected to the fuses by insulation displacement connections by inserting the output terminals of the fuses into the slots of the insulation displacement connection tabs of the power distributor for the battery side connection and the power distributor for the alternator side connection.

Another feature of the present invention is to provide an electric junction box. The electric junction box includes a power distributor which includes a first power distributor for a battery side connection and a second power distributor for an alternator side connection. The first and second power distributors generally face each other, and each have a printed circuit board on an interior side, a heat sink on an exterior side, and a bus bar between the printed circuit board and the heat sink. The branch circuit block includes insulation plates and bus bars.

The branch circuit block may be arranged substantially perpendicular to the first and second power distributors. The bus bars of the first and second power distributors may be electrically connected to the bus bars of the branch circuit block. Further, the first and second power distributors may be vertically disposed and the branch circuit block may be horizontally disposed adjacent a lower region of each of the first and second power distributors.

The branch circuit block may include a bus bar connected to a wire harness connector, in which the connector is inserted into a connector housing provided on a case of the electric junction box. The electric junction box may further include power input bus bars that include a bus bar for a battery connection and a bus bar for an alternator connection. In this regard, the power input bus bars may be disposed adjacent an upper region of each of the first and second power distributors.

Further, the power input bus bars may be connected via fuses to the bus bars of the first and second power distributors. The bus bar for the battery connection and the bus bar for the alternator connection include branched insulation displacement connection tabs having slots that receive input terminals of the fuses to facilitate an insulation displacement connection. Still further, the bus bars of the first and second power distributors have insulation displacement connection tabs having slots that receive output terminals of the fuses to facilitate an insulation displacement connection.

In the configuration described above, a power distributor in an electric junction box is not formed as a single-piece configuration, but is divided into two parts, i.e., a power distributor for the battery side connection and a power distributor for the alternator side connection, with the two parts facing each other. Therefore, it is possible to avoid an increase in the size of the electric junction box and to reduce the installation space of the electric junction box when it is installed in a vehicle. Further, since the heat sinks of the power distributor (of which the two parts are placed facing each other oppositely) face outwardly, it is possible to radiate heat effectively to the outside of the electric junction box. Additionally, by dividing the power distributor into two parts, the size of each part after the division is smaller. Also, there is the added merit of being easy to be manufacture.

Further, since one or more branch circuit blocks are placed on at least one side of the power distributor (which has its two parts placed facing each other oppositely), the branch circuit block can be utilized for making electrical connections and splices between the two parts of the divided power distributor, thereby simplifying circuit wirings on each side of the power distributor. Consequently, when power distributor circuits can be substantially simplified, it is possible to produce an electric junction box cheaply by having circuit wirings using only bus bars and eliminating printed conductors.

Further, in case where there are design changes in only one of the battery side circuit and the alternator side circuit, it is sufficient to design only for that one side of the power distributor, thereby making it possible to reduce the design load.

Since the circuit connection between the power distributor for the battery side connection, the power distributor for the alternator side connection, and the branch circuit block are implemented by welding together respectively their ends, the reliability of the electrical connection is better than a connector connection and insulation displacement connection.

Also, since the branch circuit block is placed below the vertically placed power distributor, there is no power distributor positioned below the branch circuit block. This provides more freedom in choosing a location for the connector housing on the outer surface of the lower case, and therefore simplifies the circuit wiring of the branch circuit block when making a design for the arrangement of connectors for each destination.

In the configuration described above, over-current circuit breaking functionality is provided by the fuses. The connection can be easily done between the bus bar for the battery connection and the power distributor, and the bus bar for the alternator connection and the power distributor, the bus bars providing electric power input to the electric junction box.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 2:
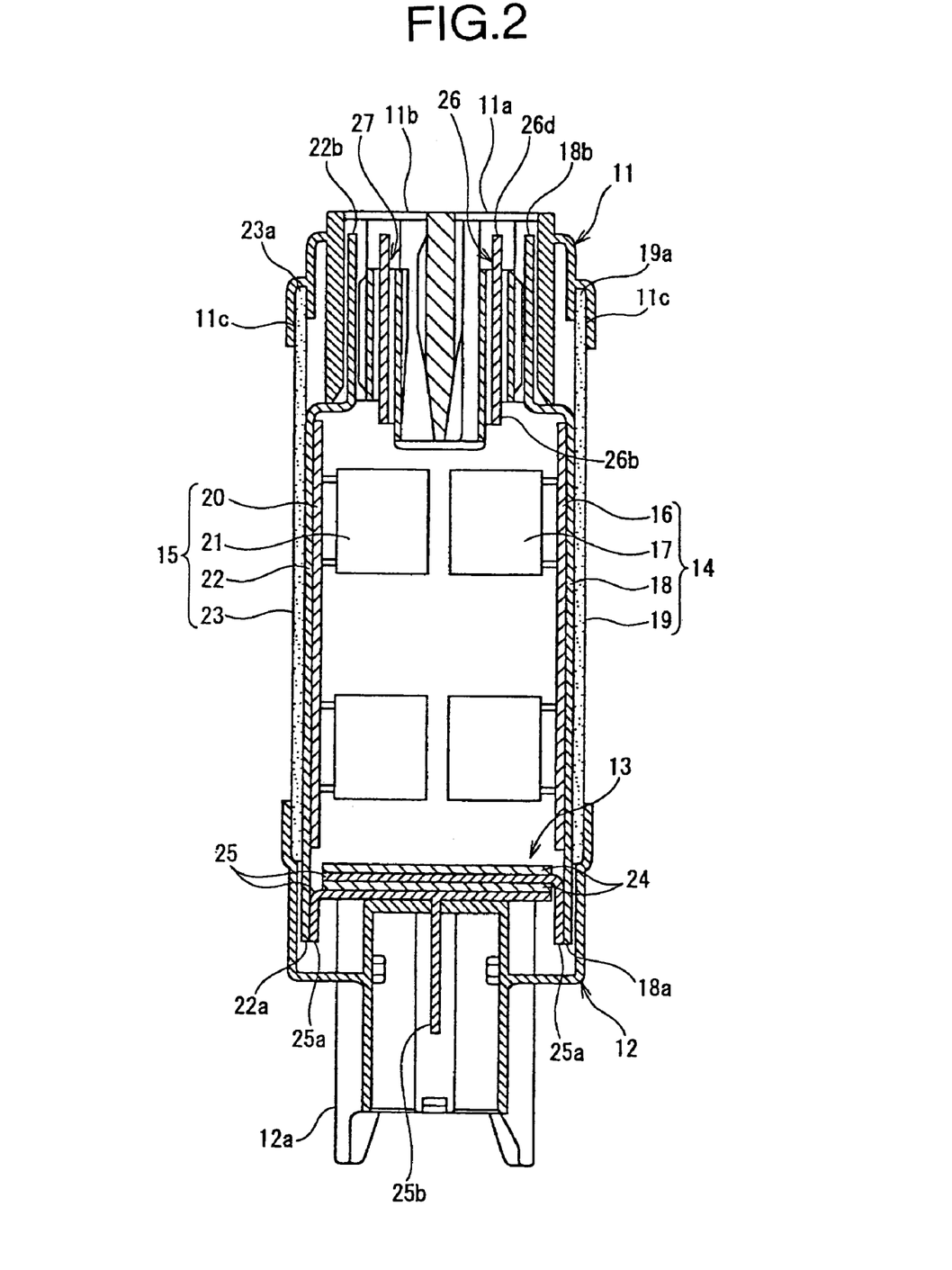
FIG. 2 is a cross-section view of the electric junction box along the A—A line shown in FIG. 1.

The following describes preferred embodiments of the present invention with reference to the drawings. FIG. 2 shows electric junction box 10 of the present embodiment which has two power distributors (hereafter referred to as PDs) 14 and 15 placed vertically and facing each other oppositely between upper case 11 and lower case 12. In the lower region of PDs 14 and 15, branch circuit block 13 is placed horizontally, and is made from the lamination of a plurality of insulation plates 24 and a plurality of bus bars 25.

Figure 3:
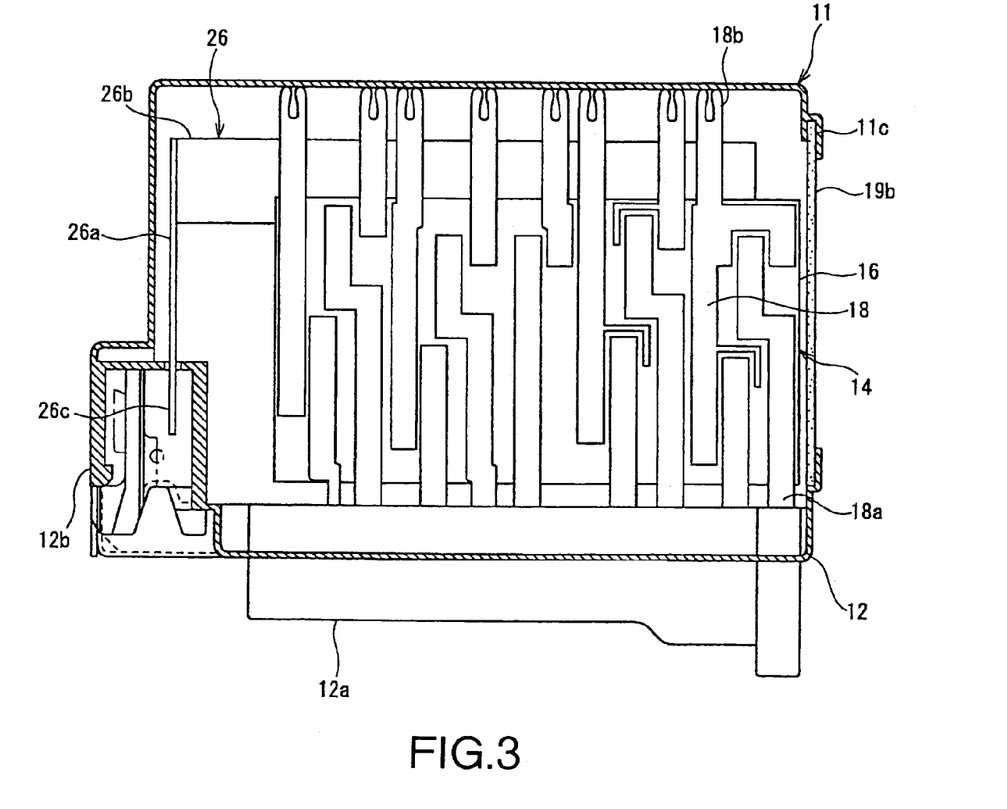
FIG. 3 is a cross-section view from one side of the electric junction box.

Fuse housings 11a and 11b are provided on the topside of upper case 11. Heat sink retention groove 11c, having a generally U-shaped cross-section, is formed on the sidewall of upper case 11. As shown in FIGS. 2 and 3, connector housing 12a and battery terminal housing 12b are formed on the bottom side of lower case 12. Tab 25b of bus bar 25 of branch circuit block 13 projects into the terminal slot of connector housing 12a of lower case 12, and is connected with the terminal of the connector that is connected to the end of a wire harness (not shown in the figure).

PD 14 is the PD for the battery side connection. On one side (the inner side in FIG. 2) of printed circuit board 16, relay 17 is mounted, and part of the terminal of the relay is connected to the printed conductor. On the other side of printed circuit board 16, bus bar 18 is fixed, and having been stamped out with a predetermined circuit pattern. Part of the terminal of relay 17 penetrates the insulation plate of printed circuit board 16 and is soldered to bus bar 18 to make an electrical connection therewith. On the outer side of bus bar 18, through an insulation sheet (not shown in the figure), metallic heat sink 19 is attached. The upper end of bus bar 18 projects into the upper region above printed circuit board 16 and forms insulation displacement connection tab 18b having a slot. The lower end of bus bar 18 projects into the lower region below the lower edge of printed circuit board 16 and forms edge portion 18a. Heat sink 19 can also be fin-shaped, for example, to enlarge its surface area.

On the other hand, PD 15 is the PD for the alternator side connection. On one side (the inner side in FIG. 2) of printed circuit board 20, relay 21 is mounted, and part of the terminal of the relay is connected to the printed conductor. On the other side of printed circuit board 20, bus bar 22 is fixed, and having been stamped out with a predetermined circuit pattern. Part of the terminal of relay 21 penetrates the insulation plate of printed circuit board 20 and is soldered to bus bar 22 to make an electrical connection therewith. On the outer side of bus bar 22, through an insulation sheet (not shown in the figure), metallic heat sink 23 is attached. The upper end of bus bar 22 projects to the upper region above printed circuit board 20 and forms insulation displacement connection tab 22b having a slot. The lower end of bus bar 22 protrudes into the lower region below the lower edge of printed circuit board 20 and forms edge portion 22a. Heat sink 23 can also be fin-shaped, for example, to enlarge its surface area.

Insulation displacement connection tab 18b of bus bar 18 of PD 14 for the battery side connection and insulation displacement connection tab 22b of bus bar 22 of PD 15 for the alternator side connection are respectively inserted into the output terminal holes of fuse housings 11a and 11b.

Edge 25a of bus bar 25 of branch circuit block 13 projects beyond the edge of insulation plate 24 and bends downwardly. Edges 25a are respectively superimposed with and welded to edge portions 18a and 22a, the welding areas being confined inside lower case 12.

Tab 25b, which bends and projects downward from bus bar 25 of branch circuit block 13, projects into connector housing 12a of lower case 12.

Electric power input bus bars 28 include bus bar 26 for battery connection and bus bar 27 for alternator connection and are placed in the upper region of PD 14 for the battery side connection and PD 15 for the alternator side connection, with PD 14 and PD 15 being placed facing each other oppositely.

Figure 4:
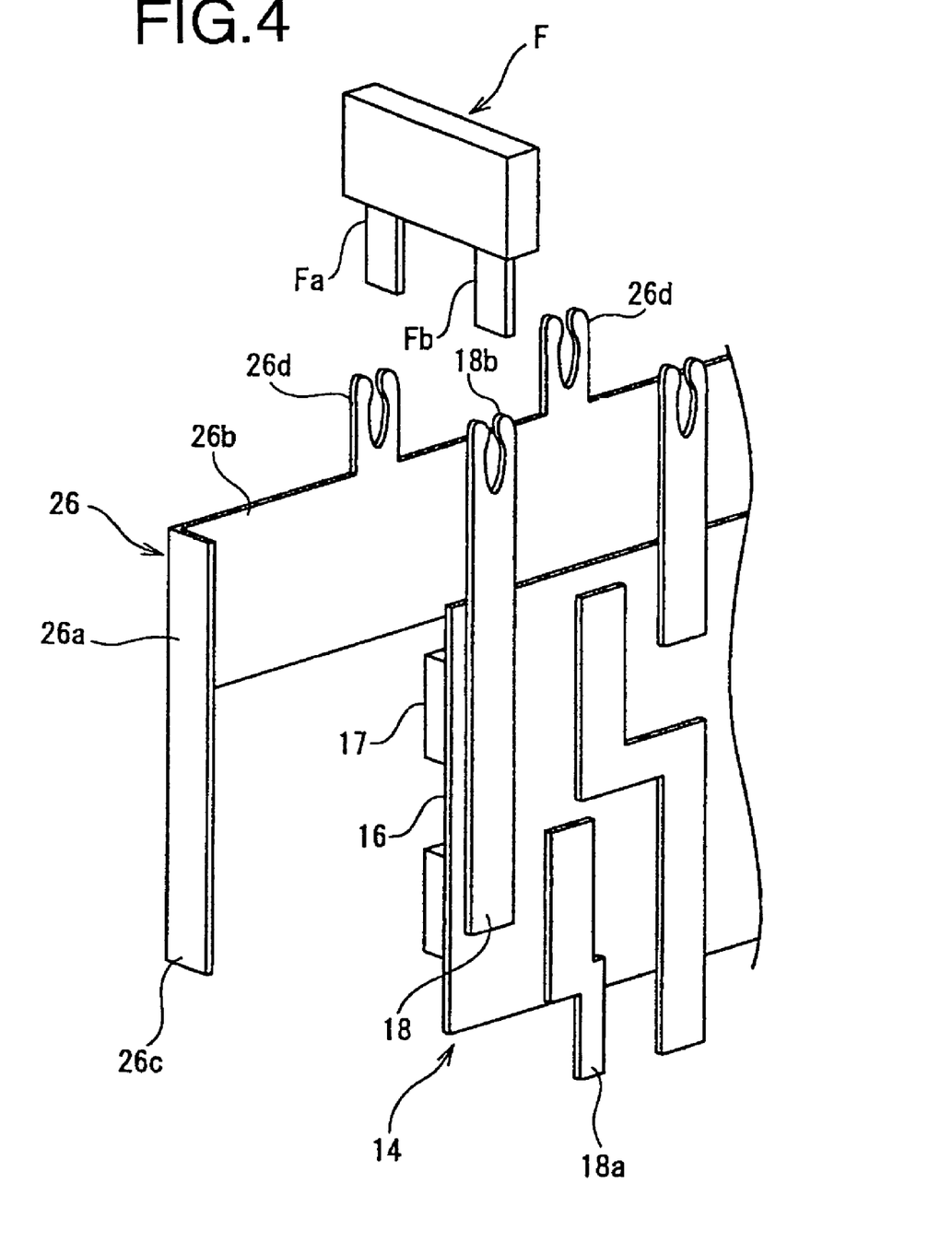
FIG. 4 is perspective view for explaining the connection between a PD for the battery side connection and a bus bar for the battery side connection.

Electric power input bus bars 28 are explained by using bus bar 26 for a battery connection, as a representative example. As shown in FIG. 4, bus bar 26 includes vertical portion 26a, extending portion 26b that bends from the upper portion of vertical portion 26a toward a perpendicular direction, and insulation displacement connection tabs 26d that project from the upper edge of extending portion 26b with intervals. Each of insulation displacement connection tabs 26d have a slot. Lower end portion 26c of vertical portion 26a projects into battery terminal receptacle 12b of lower case 12. Insulation displacement connection tabs 26d are inserted into the power input terminal holes of fuse housings 11a and 11b.

In other words, by plugging fuse F into fuse housing 11a or 11b, input terminal Fa of fuse F is inserted into the slot of insulation displacement connection tab 26d of bus bar 26 for the battery side connection, thereby connecting fuse F with bus bar 26 by an insulation displacement connection. In addition, output terminal Fb of fuse F is inserted into the slot of insulation displacement connection tab 18b of bus bar 18 of PD 14 for the battery side connection, thereby connecting fuse F with PD 14 by an insulation displacement connection. As a result, bus bar 26 for the battery side connection is electrically connected through fuse F to PD 14 for the battery side connection.

Figure 1:
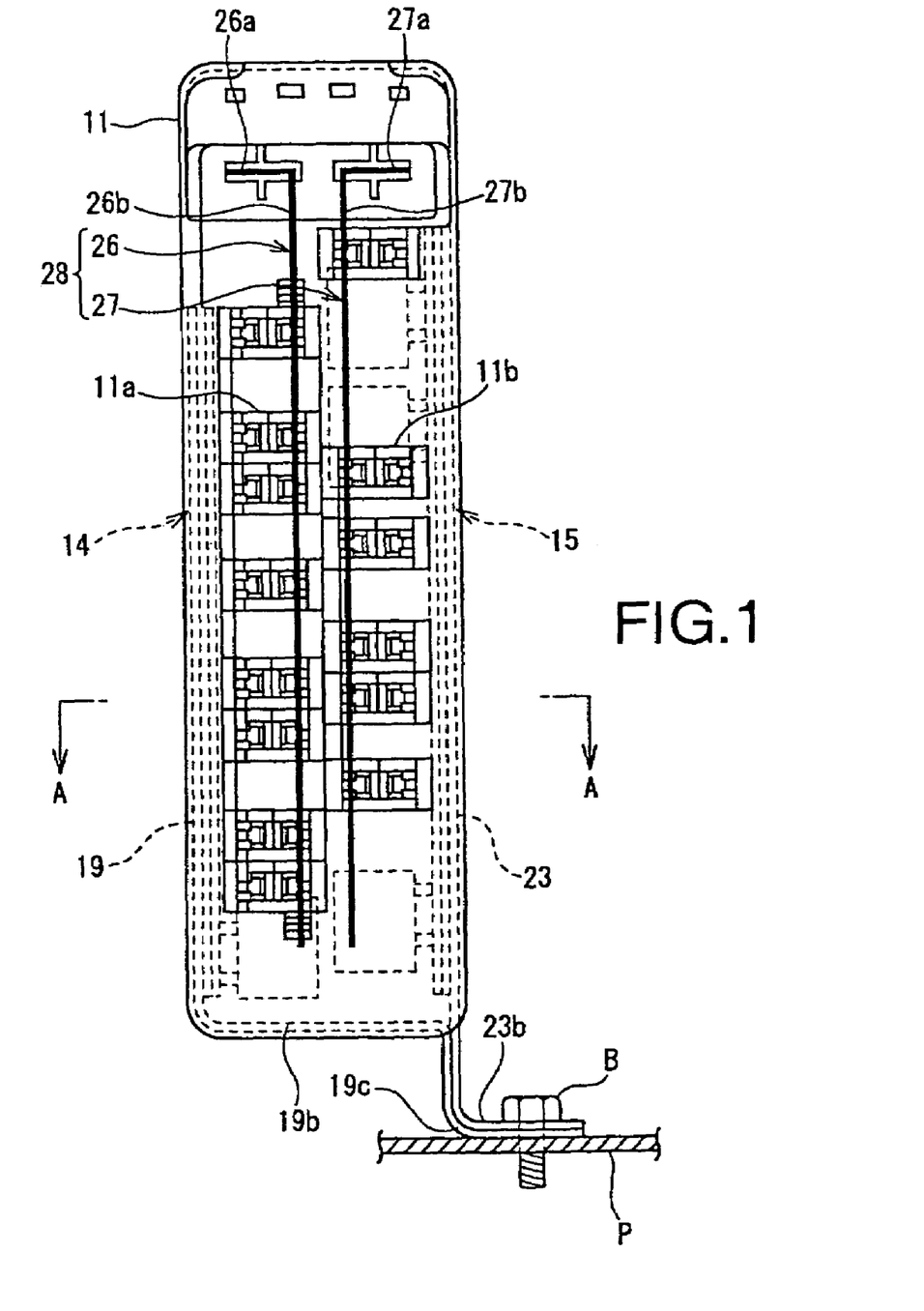
FIG. 1 is a top view of the electric junction box, according to an embodiment of the present invention.

Similar to the above-described case for bus bar 26 for the battery side connection, bus bar 27 for the alternator side connection is electrically connected to PD 15 for the alternator side connection through a fuse plugged into fuse housing 11b. In this regard, vertical portion 27a and extending portion 27b may be seen in FIG. 1.

As shown in FIG. 2, heat sink 19 of PD 14 for the battery side connection and heat sink 23 of PD 15 for the alternator side connection are exposed to the openings on the lateral sides of electric junction box 10. Upper edges 19a, 23a of heat sinks 19 and 23 are kept by heat sink retention groove 11c of upper case 11. As shown in FIG. 3, heat sink 19 of PD 14 for the battery side connection has extending portion 19b and projecting portion 19c. Extending portion 19b bends and extends to the side where PD 15 for the alternator side connection is located. Projecting portion 19c is a continuation portion of extending portion 19b and is pulled out of the case. Heat sink 23 of PD 15 for the alternator side connection has projecting portion 23b, which is extends from the case. Projecting portion 19c and projecting portion 23b are bonded together and fastened on vehicle body panel P by bolt B. When it is not required to radiate heat to vehicle body panel P, the configuration of fastening heat sinks to vehicle body panel P by bolt B is not necessary.

In the electric junction box 10 having the configuration described above, the PD is not formed as a large single-piece configuration, but is divided into PD 14 for the battery side connection and PD 15 for the alternator side connection. Additionally, PD 14 and PD 15 are placed facing each other oppositely, thereby avoiding an increase in the size of electric junction box 10. Further, since heat sinks 19 and 23 of PD 14 and PD 15 (which are placed facing each other oppositely) are exposed outwardly, it is possible to radiate heat effectively to the outside of electric junction box 10. Furthermore, since heat sinks 19 and 23 project to the outside of the case and are fastened to vehicle body panel P, heat generated at relays 17 and 21 is let out through heat conduction to vehicle body panel P, thereby further enhancing the heat radiation capability.

Since branch circuit block 13 is positioned in the lower region of PD 14 and PD 15 (which are placed facing each other oppositely), the branch circuit block 13 can be utilized for making electrical connections and splices between PD 14 and PD 15, thereby simplifying the circuit on each PD side. Furthermore, when there is a change in the circuit of one PD, for example, the circuit on the battery side (or the circuit on the alternator side), it is sufficient to design only PD 14 for the battery side connection (or PD 15 for the alternator side connection), thereby reducing the design load. PDs 14 and 15 without design changes can be used among different types of vehicles or different grades.

In the present embodiment, branch circuit block 13 is placed horizontally in the lower region of a pair of PDs 14 and 15 which are placed vertically. However, branch circuit block 13 can also be placed horizontally in the upper region of PDs 14 and 15, or in both the lower and the upper regions.

The present disclosure relates to subject matter contained in priority Japanese Application No. 2004-240365, filed on Aug. 20, 2004, which is herein expressly incorporated by reference in its entirety.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. An electric junction box for installation in an automobile, comprising:
   a power distributor comprising an internal circuit component of the electric junction box, said power distributor having relays and other electronic components mounted on one side of a printed circuit board and connected to a printed conductor, bus bars fixed on the other side of said printed circuit board, and heat sinks attached to the bus bar side of said printed circuit board;
   wherein said power distributor comprises a power distributor for a battery side connection and a power distributor for an alternator side connection, said power distributor for said battery side connection and said power distributor for said alternator side connection facing each other and each having said heat sinks facing outwardly away from said electric junction box; and
   a branch circuit block arranged perpendicular to said power distributor for said battery side connection and said power distributor for said alternator side connection, said branch circuit block configured from a lamination of bus bars and insulation plates.

2. The electric junction box according to claim 1, wherein ends of said bus bars of said power distributors are welded to the ends of said bus bars of said branch circuit block.

3. The electric junction box according to claim 1, wherein said power distributor for said battery side connection and said power distributor for said alternator side connection are vertically disposed, said branch circuit block is horizontally disposed in a lower region of said power distributor for said battery side connection and said power distributor for said alternator side connection, said branch circuit block having a bus bar connected to a connector at an end of a wire harness, said connector at said end of said wire harness being inserted into a connector housing provided on a lower case of said electric junction box, and further comprising,
   power input bus bars comprising a bus bar for a battery connection and a bus bar for an alternator connection, said power input bus bars being disposed in an upper region of said power distributor for said battery side connection and said power distributor for said alternator side connection, and being respectively connected via fuses to said bus bars of said power distributor for said battery side connection and said power distributor for said alternator side connection.

4. The electric junction box according to claim 3, wherein said bus bar for said battery connection and said bus bar for said alternator connection have branched insulation displacement connection tabs, and are connected to fuses by insulation displacement connections by inserting input terminals of said fuses into slots of said insulation displacement connection tabs of said bus bar for said battery connection and said bus bar for said alternator connection, and wherein
   said bus bars of said power distributor for said battery side connection and said power distributor for said alternator side connection have insulation displacement connection tabs, and are connected to said fuses by insulation displacement connections by inserting output terminals of said fuses into said slots of said insulation displacement connection tabs of said power distributor for said battery side connection and said power distributor for said alternator side connection.

5. The electric junction box according to claim 2, wherein said power distributor for said battery side connection and said power distributor for said alternator side connection are vertically disposed, said branch circuit block is horizontally disposed in a lower region of said power distributor for said battery side connection and said power distributor for said alternator side connection, said branch circuit block having a bus bar connected to a connector at an end of a wire harness, said connector at said end of said wire harness being inserted into a connector housing provided on a lower case of said electric junction box, and further comprising:
   power input bus bars comprising a bus bar for a battery connection and a bus bar for an alternator connection, said power input bus bars being disposed in an upper region of said power distributor side for said battery side connection and said power distributor for said alternator side connection, and being respectively connected via fuses to said bus bars of said power distributor for said battery side connection and said power distributor for said alternator side connection.

6. The electric junction box according to claim 5, wherein said bus bar for said battery connection and said bus bar for said alternator connection have branched insulation displacement connection tabs, and are connected to fuses by insulation displacement connections by inserting input terminals of said fuses into slots of said insulation displacement connection tabs of said bus bar for said battery connection and said bus bar for said alternator connection, and wherein
   said bus bars of said power distributor for said battery side connection and said power distributor for said alternator side connection have insulation displacement connection tabs, and are connected to said fuses by insulation displacement connections by inserting the output terminals of said fuses into said slots of said insulation displacement connection tabs of said power distributor for said battery side connection and said power distributor for said alternator side connection.

7. An electric junction box, comprising:
a power distributor comprising a first power distributor for a battery side connection and a second power distributor for an alternator side connection, said first and second power distributors generally facing each other, and said first and second power distributors each having a printed circuit board on an interior side, a heat sink on an exterior side, and a bus bar between said printed circuit board and said heat sink; and
a branch circuit block comprising a plurality of insulation plates and bus bars.

8. The electric junction box according to claim 7, wherein said branch circuit block is arranged substantially perpendicular to said first and second power distributors.

9. The electric junction box according to claim 8, wherein said bus bars of said first and second power distributors are electrically connected to said bus bars of said branch circuit block.

10. The electric junction box according to claim 7, wherein said first and second power distributors are vertically disposed.

11. The electric junction box according to claim 10, wherein said branch circuit block is horizontally disposed adjacent a lower region of each of said first and second power distributors.

12. The electric junction box according to claim 7, wherein said branch circuit block includes a bus bar connected to a wire harness connector, said connector being inserted into a connector housing provided on a case of said electric junction box.

13. The electric junction box according to claim 12, further comprising power input bus bars including a bus bar for a battery connection and a bus bar for an alternator connection, said power input bus bars being disposed adjacent an upper region of each of said first and second power distributors.

14. The electric junction box according to claim 13, wherein said power input bus bars are connected via fuses to said bus bars of said first and second power distributors.

15. The electric junction box according to claim 14, wherein said bus bar for said battery connection and said bus bar for said alternator connection include branched insulation displacement connection tabs having slots that receive input terminals of said fuses to facilitate an insulation displacement connection.

16. The electric junction box according to claim 14, wherein said bus bars of said first and second power distributors have insulation displacement connection tabs having slots that receive output terminals of said fuses to facilitate an insulation displacement connection.

* * * * *